United States Patent [19]
Jones et al.

[11] 3,834,175
[45] Sept. 10, 1974

[54] SERVO TEMPERATURE CONTROL VALVE FOR REFRIGERATION SYSTEM

[75] Inventors: Dana C. Jones, Orlando; Cleo E. Cook, Melrose, both of Fla.; Alfred K. Murray, Dover, N.J.

[73] Assignee: General Motors Corporation, Detroit, Mich.

[22] Filed: Aug. 31, 1973

[21] Appl. No.: 393,424

[52] U.S. Cl.................... 62/196, 62/278, 236/101
[51] Int. Cl............................................ F25b 41/00
[58] Field of Search ............... 62/196, 278; 236/101

[56] References Cited
UNITED STATES PATENTS
3,715,894   2/1973   Widdowson .......................... 62/278

*Primary Examiner*—Meyer Perlin
*Attorney, Agent, or Firm*—K. H. MacLean, Jr.

[57] ABSTRACT

A vapor compression type air conditioning system including a defrost control servo valve between the compressor and the evaporator and in bypass relationship to a condenser and expansion valve which directs a metered quantity of warm refrigerant directly to the evaporator to maintain an evaporator temperature above 32° F. A thermostatic element responsive to evaporator refrigerant temperature moves a pilot needle valve which controls the pressure in a variable volume control chamber formed on one end of a piston. A main needle valve extending from the other end of the piston is moved with the piston in response to pressure changes in the control chamber to a location corresponding to the position of the pilot needle valve. The main needle valve coacts with a bypass opening to regulate the quantity of warm refrigerant introduced to the evaporator.

3 Claims, 1 Drawing Figure

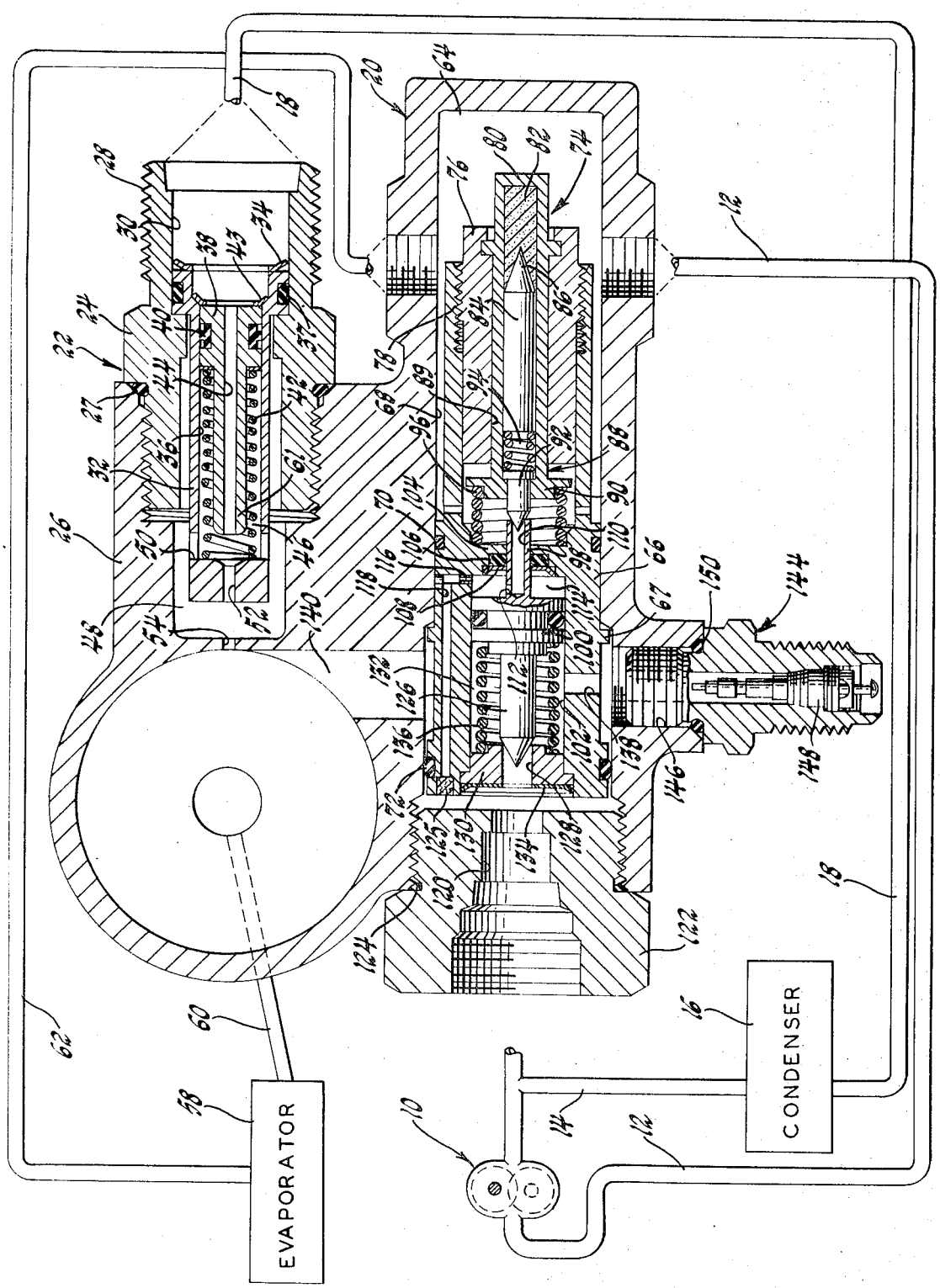

SERVO TEMPERATURE CONTROL VALVE FOR REFRIGERATION SYSTEM

This invention relates to a vapor compression type air conditioning system which includes a defrost servo valve assembly between the compressor and the evaporator to introduce a metered quantity of warm refrigerant to the evaporator for maintaining the temperature of the evaporator above 32° F.

There is a tendency for frost to accumulate on the evaporator of an air conditioning system under some operating conditions. It is known to provide a throttling valve which restricts refrigerant flow through the compressor inlet line to maintain refrigerant pressure in the evaporator above a pressure level corresponding to a temperature of 32°F. Although this prevents frost accumulation on the evaporator, it has a disadvantage of reducing refrigerant flow and decreases the evaporator's capacity to cool the passenger compartment of the automobile. The efficiency of the system is decreased by the restricted flow. Proper compressor lubrication and cooling which depends on refrigerant flow may also be reduced.

The present defrost servo valve regulates the quantity of warm refrigerant passed from the compressor to the evaporator and maintains the temperature of the evaporator above 32°F. A pilot needle valve is moved by a temperature responsive element in fluid contact with refrigerant from the evaporator to regulate refrigerant pressure in a variable volume control chamber, one wall of which is formed by a piston which is axially reciprocal within a housing in response to pressure changes within the control chamber. A main needle valve extending from the piston coacts with a bypass opening to regulate the quantity of warm refrigerant introduced into the evaporator for defrosting. The quantity of warm refrigerant supplied corresponds to the position of the pilot needle valve and the thermal element.

The elimination of the throttling valve by the present defrost servo valve system reduces the maximum difference in pressure between the evaporator or low side of the system and the compressor or the high side of the system which occurs under low ambient operating conditions. This increases the efficiency of the system because less work input is needed to drive the compressor for a given amount of cooling.

When an air conditioning system is first activated during warm ambient temperatures, the subject defrost servo valve remains closed for the period of time until air drawn through the evaporator is sufficiently cool to decrease the refrigerant temperature in the evaporator. The absence of a flow restriction caused by a throttling valve allows a more rapid decrease in passenger compartment temperature than would be the case with a throttling valve.

Another advantage of the present defrost system over prior throttling valve systems in the prevention of subatmospheric pressures within the refrigerating system which can be caused near the compressor inlet by a flow restriction. Sub-atmospheric pressures may cause air to leak into the air conditioning system which is undesirable. The servo valve in the subject system will not cause refrigerant pressure to fall below atmospheric pressure.

Therefore, it is an object of this invention to provide a defrost system which directs a quantity of warm refrigerant to the evaporator in response to falling refrigerant temperature of the evaporator.

It is a further object of the invention to provide a defrost system which directs a sufficient quantity of warm refrigerant from the compressor to the evaporator in response to decreasing refrigerant temperature of the evaporator to maintain the temperature of the evaporator above 32°F. even under operating conditions which normally produce evaporator temperatures below freezing.

It is a still further object of the invention to provide a simple defrost servo valve assembly operated in response to a thermostatic element in contact with evaporator refrigerant which positions a pilot valve for moving a piston and interconnected main valve for metering refrigerant flow from the compressor to the evaporator to maintain the evaporator at a 32°F. temperature.

Further objects and advantages of the present invention will be apparent from the following detailed description, reference being had to the accompanying drawings in which a preferred embodiment of the invention is clearly shown.

In the drawings, a diagrammatic view of an air conditioning system includes a sectional view of a combination expansion valve and defrost servo control valve assembly.

Referring to the drawing, there is illustrated an air conditioning system including a compressor 10 adapted to be driven by an utomobile engine (not shown). The compressor 10 draws refrigerant through a suction or inlet conduit 12 and then passes compressed refrigerant through a discharge or outlet conduit 14 into a condenser 16, which is normally located in front of the automobile radiator.

The refrigerant is cooled and liquefied in condenser 16 from which it flows through a conduit 18 to the combination expansion and defrost valve assembly 20. An expansion valve portion 22 of the assembly 20 includes member 24 which is threadably supported within the main housing 26 of assembly 20. An O-ring seal 27 between members 24 and 26 prevents leakage therebetween. The conduit 18 is threadably connected at 28 to the housing member 24. A central bore 30 in member 24 houses a stationary expansion valve housing 32 which is held in the bore by an annular expansion member 34. An O-ring seal 37 between members 24 and 32 prevents refrigerant leakage therebetween.

The valve housing 32 has a central bore or cylinder 36 which supports a movable valve member 38. An annular seal 40 around member 38 prevents leakage therebetween. A compression spring 42 pushes member 38 into a position against annular retainer 43. A passage 44 which extends through member 38 connects the conduit 18 with interior 46 of housing member 32. After flowing through the passage 44, refrigerant enters a cavity 48 through ports 50 in the member 32. A second passage 52 is centrally located in the end of member 32 and is aligned with the passage 44. An outlet passage 54 in housing 26 discharges refrigerant from cavity 48 to an evaporator 58 through conduit 60.

Because passage 44 is a restriction to fluid flow through the valve, the pressure within spaces 46 and 48 and in evaporator 58 is lower than the pressure within conduit 18. This causes the higher pressure in conduit 18 to move the end 61 of valve member 38 to the left in the drawing into engagement with the end of member 32. The combined flow restriction through aligned passages 44 and 52 normally supplies desirable refrigerant quantities to the evaporator 58.

When the heat load on the evaporator 58 is great, refrigerant pressure in the evaporator may increase due to superheating of refrigerant. Superheating is the temperature of refrigerant above its boiling point at a given pressure. The greater resultant pressure in the evaporator is transmitted to cavity 48 and interior 46 where it acts to move the valve member 38 to the right to separate passages 44 and 52. This movement reduces the flow restriction of the expansion valve and increases the quantity of refrigerant supplied to the evaporator. In turn, the increased flow to the evaporator tends to decrease superheating and lower evaporator pressure to a desirable level.

Refrigerant flows from the evaporator 58 through a conduit 62 and into a chamber or enclosure 64 formed within a cylindrical bore 68 of housing 26. A valve housing 66 is positioned within bore 68 by an annular flange 67. O-ring type seals 70 and 72 between the valve body 66 and the cylinder 68 prevent refrigerant leakage therebetween. The valve body 66 supports a temperature sensing thermal element 74 in a sleeve member 76 which is threadably secured to the valve body at 78. Thermal element 74 includes a metal case 80 which contains thermally expandable material 82. A plunger or piston 84 with a generally conical end 86 is supported partially in the case 80 and extends from one end. The thermal element 74 is exposed to refrigerant within enclosure 64 which comes from the evaporator. When the refrigerant temperature decreases, contraction of the material 82 causes the plunger 84 to move to the right. Accordingly, when the refrigerant temperature increases, the material 82 expands to cause the plunger 84 to move to the left.

A pilot valve assembly 88 is supported in a bore 89 adjacent the end of plunger 84 and is movable therein as plunger 84 moves in response to temperature changes of refrigerant in enclosure 64. The pilot valve assembly includes a needle valve member 92 mounted in a sleeve member 90. A coil spring 94 extends between the valve member 92 and the end of plunger 84. Another coil spring 96 extends between sleeve member 90 and housing 66. The conical end of the needle valve 92 coacts with the end of a tubular projection 98 extending from a piston 100 which is supported within a cylindrical bore 102 in the valve housing 66. The tubular projection 98 extends through a thin wall 104 which separates the cylinder 102 from the thermal element 74 and forms a seat for the needle valve element 92. An O-ring type seal 106 surrounds the tubular projection 98 and is retained in wall 104 by a member 108. An axial passage 110 and radial port 112 in tubular member 98 communicate the enclosure 64 with a control chamber 114 formed between the piston 100 and cylinder 102. The control chamber 114 is fluidly interconnected to the compressor outlet by a small bleed orifice 116, passage 118 and an inlet 120 in a fitting 122. An O-ring type seal 124 between the fitting 122 and housing 26 prevents fluid leakage. A filter 125 in the passage 118 prevents clogging of the bleed orifice 116 by particles.

A main needle valve member 126 extends from one side of the piston 100 and moves within cylinder 102 with the piston. The valve 126 extends toward an opening or passage 128 formed by fitting 130 between the inlet 120 and an interior space 132 of cylinder 102. A retainer 134 holds the fitting 130 within cylinder 102. A spring 136 extends between fitting 130 and piston 100 to bias the needle valve 126 to an open position with respect to opening 128. An outlet port 138 extends through the wall of valve housing 66 between space 132 and a passage 140 leading to the evaporator.

During operation of the air conditioning system, when there is a large heat load on evaporator 58, the relatively warm temperature of refrigerant within enclosure 64 causes the plunger 84 to be moved to the left. This movement will cause the needle valve element 92 to block passage 110, and the refrigerant pressure at the inlet 120 will be transmitted through passage 118 and bleed orifice 116 into the control chamber 114. This relatively large pressure in chamber 114 maintains the left position of the piston 100 shown in the drawing which blocks the defrost passage 128.

When the temperature of refrigerant in enclosure 64 decreases perhaps because of frost accumulation on the evaporator 58 or a lighter heat load, the material 82 will contract and cause plunger 84 and pilot valve 88 to move to the right under the influence of springs 94 and 96. This opens passage 110 and port 112 to the control chamber 114 and causes a reduction in refrigerant pressure within control chamber 114 by the escape of refrigerant into enclosure 64 which is at a lower pressure. The reduction in a refrigerant pressure causes spring 136 to move the piston 100 and needle valve 126 to the right in the drawing and to open passage 128. Warm refrigerant from the compressor outlet then flows through the passage 128, space 132, outlet port 138 and passage 140 to the evaporator for maintaining evaporator temperature above 32°F. The piston 100 moves to the right until the tubular valve seat 98 contacts the pilot needle valve 92 and closes passage 110. When the assage 110 is blocked, refrigerant pressure in the control cavity 114 is increased due to its communication with the compressor outlet by passage 118 and orifice 116. The pressure increases in control chamber 114 until the piston 100 is moved slightly to the left which opens the passage 110. The piston 100 thereafter maintains a position in cylinder 102 causing the tubular valve seat 98 to coact with the needle valve 92 and open and close passage 110. This permits a quantity of hot refrigerant to flow through the passage 128 to the evaporator and maintains its temperature slightly above 32°F. to prevent frost formation.

The housing 26 receives a fitting 144 which threadably engages a bore 146 and includes a check valve 148. Fitting 144 is utilized to initially fill the air conditioning system with refrigerant and may be used to recharge the system with refrigerant. An O-ring seal 150 prevents refrigerant leakage between the fitting 144 and housing 26.

While the embodiment of the present invention as herein illustrated constitutes a preferred form, it is to be understood that other forms might be adapted.

What is claimed is as follows:

1. An air conditioning system comprising: an evaporator for cooling air in a passenger compartment; a compressor for pressurizing refrigerant drawn from said evaporator; a condenser for cooling refrigerant discharged from said compressor; expansion valve means for controlling the quantity of refrigerant introduced to said evaporator; a defrost servo control valve fluidly connected between said compressor and said evaporator in bypass relationship to said condenser and said expansion valve means to direct a quantity of warm refrigerant from said compressor into said evaporator for maintaining said evaporator temperature above a freeze level; said defrost servo control valve including a housing with an inlet fluidly connected to the outlet of the compressor and an outlet fluidly connected to the evaporator; a valve member coactive with said inlet to regulate the quantity of warm refrigerant introduced to said evaporator; a piston slidably mounted in a cylinder with said valve member connected to one end to position said valve member with respect to said inlet; the other end of said piston forming with said cylinder a variable volume control chamber which is fluidly connected by a small bleed orifice to said inlet to transmit refrigerant pressure therebetween; a tubular valve seat extending from said other end of said piston through said control chamber and into and adjacent enclosure which is fluidly connected to said outlet of the evaporator; said tubular valve seat forming a passage for withdrawing refrigerant from said control chamber into said enclosure; a pilot valve in said enclosure coactive with the end of said tubular valve seat for opening and closing said passage to regulate the pressure within said control chamber and thereby causing said piston and connected tubular valve seat to attain a position in said housing with the end of said tubular valve seat contacting said pilot valve member; a thermostatic element in said enclosure with a member movable with temperature changes of evaporator refrigerant; said movable member being operably connected to said pilot valve to position said pilot valve with respect to the end of said tubular valve seat in response to refrigerant temperature changes, whereby the position of said thermostatic element and connected pilot valve control the location of said tubular valve seat and connected piston which moves said main valve member with respect to said inlet to direct sufficient warm refrigerant from the compressor to the evaporator for maintaining said evaporator temperature above a freeze level.

2. An air conditioning system comprising: an evaporator for cooling air in a passenger compartment; a compressor for pressurizing refrigerant drawn from said evaporator; a condenser for cooling refrigerant discharged from said compressor; expansion valve means for controlling the quantity of refrigerant introduced to said evaporator; a defrost servo control valve fluidly connected between said compressor and said evaporator in bypass relationship to said condenser and said expansion valve means to direct a quantity of warm refrigerant from said compressor into said evaporator for maintaining said evaporator temperature above a freeze level; said defrost servo control valve including a housing with an inlet fluidly connected to the outlet of the compressor and an outlet fluidly connected to the evaporator; a needle valve member extending into said inlet to regulate the quantity of warm refrigerant introduced to said evaporator; a piston slidably mounted in a cylinder with said needle valve member connected to one end to position said member in said inlet; the other end of said piston forming with said cylinder a variable volume control chamber which is fluidly connected by a small bleed orifice to said inlet to transmit refrigerant pressure therebetween; a tubular valve seat extending from said other end of said piston through said control chamber and into an adjacent enclosure which is fluidly connected to said outlet of the evaporator; said tubular valve seat forming a passage for withdrawing refrigerant from said control chamber into said enclosure; a pilot needle valve in said enclosure coactive with the end of said tubular valve seat for opening and closing said passage to regulate the pressure within said control chamber and thereby causing said piston and connected tubular valve seat to attain a position in said housing with the end of said tubular valve seat contacting said pilot valve; a thermostatic element in said enclosure having a member movable with temperature changes of evaporator refrigerant; said movable member being operably connected to said pilot valve to position said pilot valve with respect to the end of said tubular valve seat in response to refrigerant temperature changes, whereby the position of said thermostatic element and connected pilot valve controls the location of said tubular valve seat and connected piston and main needle valve to direct sufficient warm refrigerant from the compressor to the evaporator for maintaining said evaporator temperature above a freeze level.

3. A defrost servo control valve adapted to be fluidly connected between a refrigerant compressor and evaporator of an air conditioning system comprising: a valve housing having an inlet and an outlet adapted to be connected to the compressor outlet and evaporator inlet respectively; a needle valve member extending into said inlet for regulating the flow of warm refrigerant from the compressor to the evaporator; a piston slidably mounted in a cylinder and operably connected at one end to said needle valve member for positioning it in said inlet; the other end of said piston forming a variable volume control chamber with said cylinder and which is fluidly connected by a small bleed orifice to said inlet to transmit refrigerant pressure therebetween; a tubular valve seat portion of said piston extending from said other end of the piston through said control chamber and into an adjacent enclosure which fluidly connects with the evaporator outlet; said tubular valve seat forming passage for withdrawing refrigerant from said control chamber into said enclosure; a pilot needle valve in said enclosure coactive with the end of said tubular valve seat for opening and closing said passage to regulate the pressure within said control chamber and thereby causing said piston and connected tubular valve seat to attain a position in said housing with the end of said tubular valve seat contacting said pilot valve; a thermostatic element in said enclosure with a member movable with temperature changes of evaporator refrigerant; said movable member being operably connected to said pilot valve to position said pilot valve with respect to the end of said tubular valve seat in response to refrigerant temperature changes, whereby the position of said thermostatic element and connected pilot valve controls the location of said piston which moves said main needle valve with respect to said inlet to direct sufficient warm refrigerant from the compressor to the evaporator for maintaining said evaporator temperature above a freeze level.

\* \* \* \* \*